(12) United States Patent
Hsieh

(10) Patent No.: US 10,001,606 B1
(45) Date of Patent: Jun. 19, 2018

(54) MULTI-FUNCTION LIGHT GUIDE SOCKET

(71) Applicant: KANG YANG HARDWARE ENTERPRISES CO., LTD., New Taipei (TW)

(72) Inventor: Shu-Li Hsieh, New Taipei (TW)

(73) Assignee: KANG YANG HARDWARE ENTERPRISES CO., LTD., New Taipei (TW)

( * ) Notice: Subject to any disclaimer, the term of this patent is extended or adjusted under 35 U.S.C. 154(b) by 0 days. days.

(21) Appl. No.: 15/667,554

(22) Filed: Aug. 2, 2017

(30) Foreign Application Priority Data

Jun. 28, 2017 (TW) .............................. 106209448 U

(51) Int. Cl.
*G02B 6/38* (2006.01)
*F21V 8/00* (2006.01)

(52) U.S. Cl.
CPC ......... *G02B 6/3893* (2013.01); *G02B 6/0096* (2013.01)

(58) Field of Classification Search
CPC ... G02B 6/0096; G02B 6/3895; G02B 6/3893
See application file for complete search history.

(56) References Cited

U.S. PATENT DOCUMENTS

| | | | | |
|---|---|---|---|---|
| 4,419,722 A | * | 12/1983 | Bury | F21V 19/002 362/382 |
| 4,704,669 A | * | 11/1987 | Brunner | F21V 19/002 257/E33.055 |
| 5,709,462 A | * | 1/1998 | Rumpel | F21V 3/00 362/103 |
| 6,095,673 A | * | 8/2000 | Goto | B29C 47/0019 362/307 |
| 7,784,993 B2 | * | 8/2010 | Yu | H05B 33/0803 362/652 |
| 2008/0143234 A1 | * | 6/2008 | Yu | F21V 3/00 313/318.08 |
| 2014/0120764 A1 | * | 5/2014 | Valadas | G02B 6/3817 439/488 |

FOREIGN PATENT DOCUMENTS

TW  M263625  5/2005

* cited by examiner

*Primary Examiner* — Thomas A Hollweg
*Assistant Examiner* — Mary A El Shammaa
(74) *Attorney, Agent, or Firm* — Guice Patents PLLC

(57) ABSTRACT

A multi-function light guide socket, including: a connecting tube, including a light source fixation part and a component fixation part, the light source fixation part having a pair of hollowed slots formed at two peripheral locations thereof, the pair of hollowed slots each having a first column therein along an axial direction, the first column having a first low-side stop edge on an inner surface thereof, at least two latching flaps protruding from an inner surface of a bottom opening of the connecting tube to cooperate with a pair of the first low-side stop edges to clamp a flange of a light emitting diode, and the component fixation part having at least two latching slots formed at at least two peripheral locations thereof; and an optical component including an engaging part for being plugged into and engaged with the component fixation part.

19 Claims, 12 Drawing Sheets

A-A

B-B

MULTI-FUNCTION LIGHT GUIDE SOCKET

BACKGROUND OF THE INVENTION

Field of the Invention

The present invention relates to a light guide socket, especially to a multi-function light guide socket capable of combining different optical components of different optical functions according to different light guiding requirements, such as indication, illumination or data transmission.

Description of the Related Art

As LED (light emitting diode) has advantages of small size and power-saving in lighting, therefore, it is widely used in light indication of machines or in alarm lamps. Besides, with the advance of material technology, the brightness of the LED has increased substantially and many colors thereof have been available, so the LED has also been applied to the field of illumination.

In some light guide applications, such as in a display apparatus having a display panel shortly distanced from a printed circuit board, light guide sockets are generally used for light guiding or illumination. The light guide socket generally has at least one light guide column installed on the printed circuit board, the light guide column having a free end located at the display panel. As a result, when light sources, such as LEDs are lit on, light emitted from the light sources will be transmitted by at least one light guide column to provide indication or illumination on the display panel.

When there is a long distance between the display panel and the printed circuit board, conventional designs use connecting wires to connect the printed circuit board and the display panel and install light sources or LEDs on the display panel for indication or illumination. However, with the conventional designs, a technician or manufacturer has to check the conduction states at two ends of the connecting wires before switching on the light sources. In addition, the installation of the connecting wires is inconvenient and dangerous, especially in a manufacturing factory.

In view of these problems, a Taiwan patent M263625 discloses an "LED holding device", where an LED is positioned in a central part of the LED holding device, and two pins of the LED extend through a space enclosed by a left wing part and a right wing part; the central part has a top opening, which can be used for receiving an optical fiber cable having a terminal end covered with a transparent indication cap, and when the LED is switched on, the emitted light can be transmitted via the optical fiber and travel out the transparent indication cap; and the LED has two pins inserted in a printed circuit board and fixed in place by soldering. The Taiwan patent does overcome the inconvenience of installing connecting wires to couple the printed circuit board to the LEDs on the display panel for light indication, and the optical fiber cable it adopts for light transmission generally has low transmission loss.

However, as the light guide socket having a light guide column and the LED holding device (that is, a light guide socket having a receiving tube) are components of different individual functions, a manufacturer tends to suffer inventory cost for preparing these two different types of light guide socket. Therefore, a novel design of a light guide socket capable of optionally combining different optical components according to different light guiding requirements is needed in the field to overcome the foregoing problems.

SUMMARY OF THE INVENTION

The main objective of the present invention is to propose a multi-function light guide socket, which includes a connecting tube capable of optionally combining different optical components according to different light guiding requirements, such as indication, illumination or data transmission, so as to reduce inventory quantity of the optical components and thereby reduce inventory cost.

To attain the foregoing objective, a multi-function light guide socket is disclosed, including: a connecting tube, having an axial direction and including a light source fixation part at a low side and a component fixation part at a high side, the light source fixation part having a pair of hollowed slots formed opposite each other at two peripheral locations thereof, each slot of the pair of hollowed slots having a first column formed therein along the axial direction, the first column having a first low-side stop edge on an inner surface thereof extending perpendicular to the axial direction, the connecting tube having at least two latching flaps protruding from an inner surface of a bottom opening of the light source fixation part to cooperate with a pair of the first low-side stop edges to clamp a flange of a light emitting diode, and the component fixation part having at least two latching slots at at least two peripheral locations thereof extending perpendicular to the axial direction; and an optical component, made of a transparent material and including an engaging part for being plugged into the component fixation part, the engaging part having at least two protruding hooks for engaging with the at least two latching slots to fix the optical component in the component fixation part, and a light guide column having a geometric shape being formed at an upper side of the engaging part.

To attain the foregoing objective, another multi-function light guide socket is disclosed, including: a connecting tube, having an axial direction and including a light source fixation part at a low side and a component fixation part at a high side, the light source fixation part having a pair of hollowed slots formed opposite each other at two peripheral locations thereof, each slot of the pair of hollowed slots having a first column formed therein along the axial direction, the first column having a first low-side stop edge on an inner surface thereof extending perpendicular to the axial direction, the connecting tube having at least two latching flaps protruding from an inner surface of a bottom opening of the light source fixation part to cooperate with a pair of the first low-side stop edges to clamp a flange of a light emitting diode, and the component fixation part having at least two latching slots at at least two peripheral locations thereof extending perpendicular to the axial direction; and an optical component, including an engaging part for being plugged into the component fixation part, the engaging part having at least two protruding hooks for engaging with the at least two latching slots to fix the optical component in the component fixation part, and a receiving tube being formed along the axial direction at an upper side of the engaging part and having a cable receiving hole connected with the engaging part for insertion of an optical fiber.

DETAILED DESCRIPTION OF THE PREFERRED EMBODIMENTS

Figure 1:
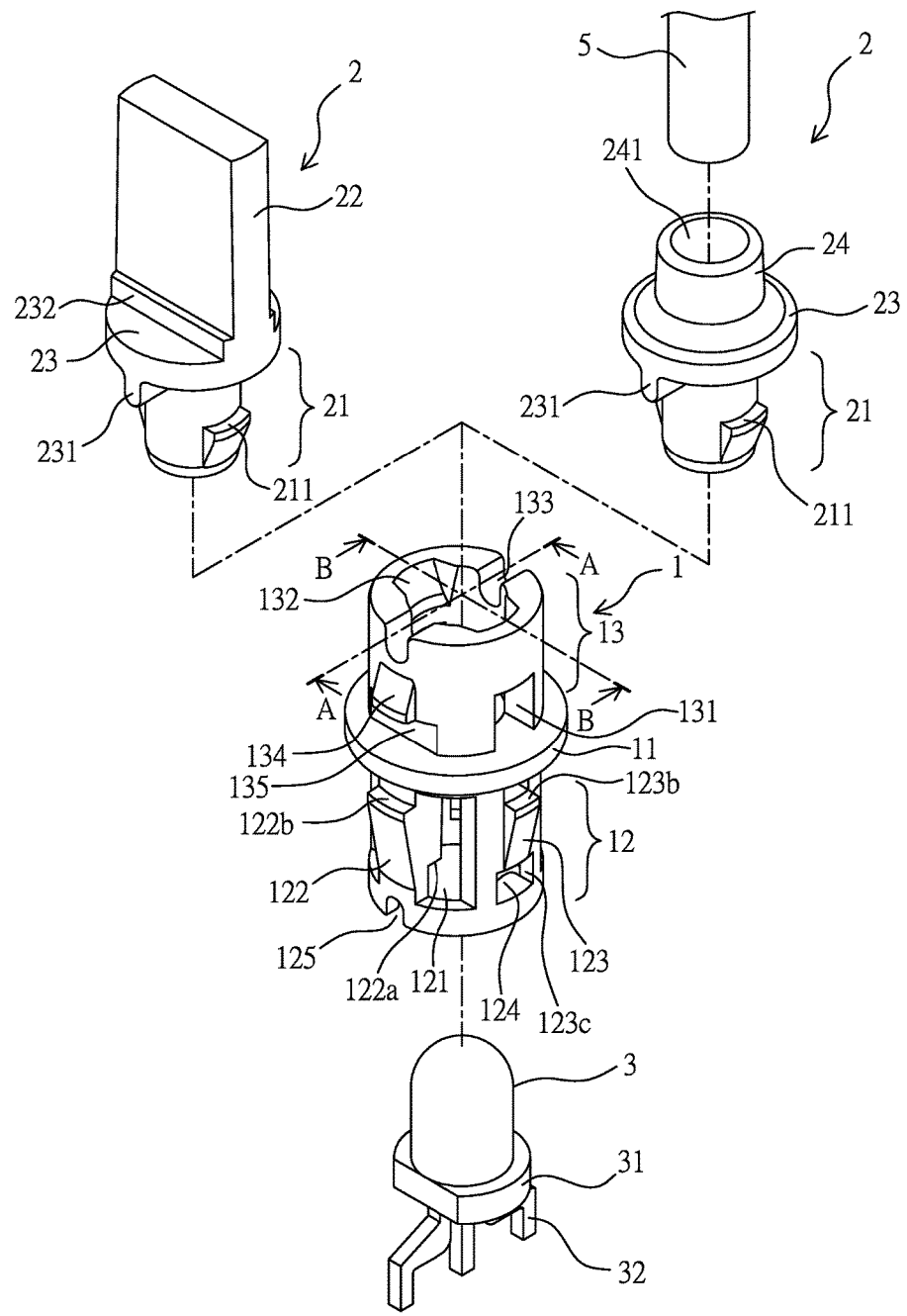
FIG. 1 illustrates an exploded view of a multi-function light guide socket according to one embodiment of the present invention.
Figure 2:
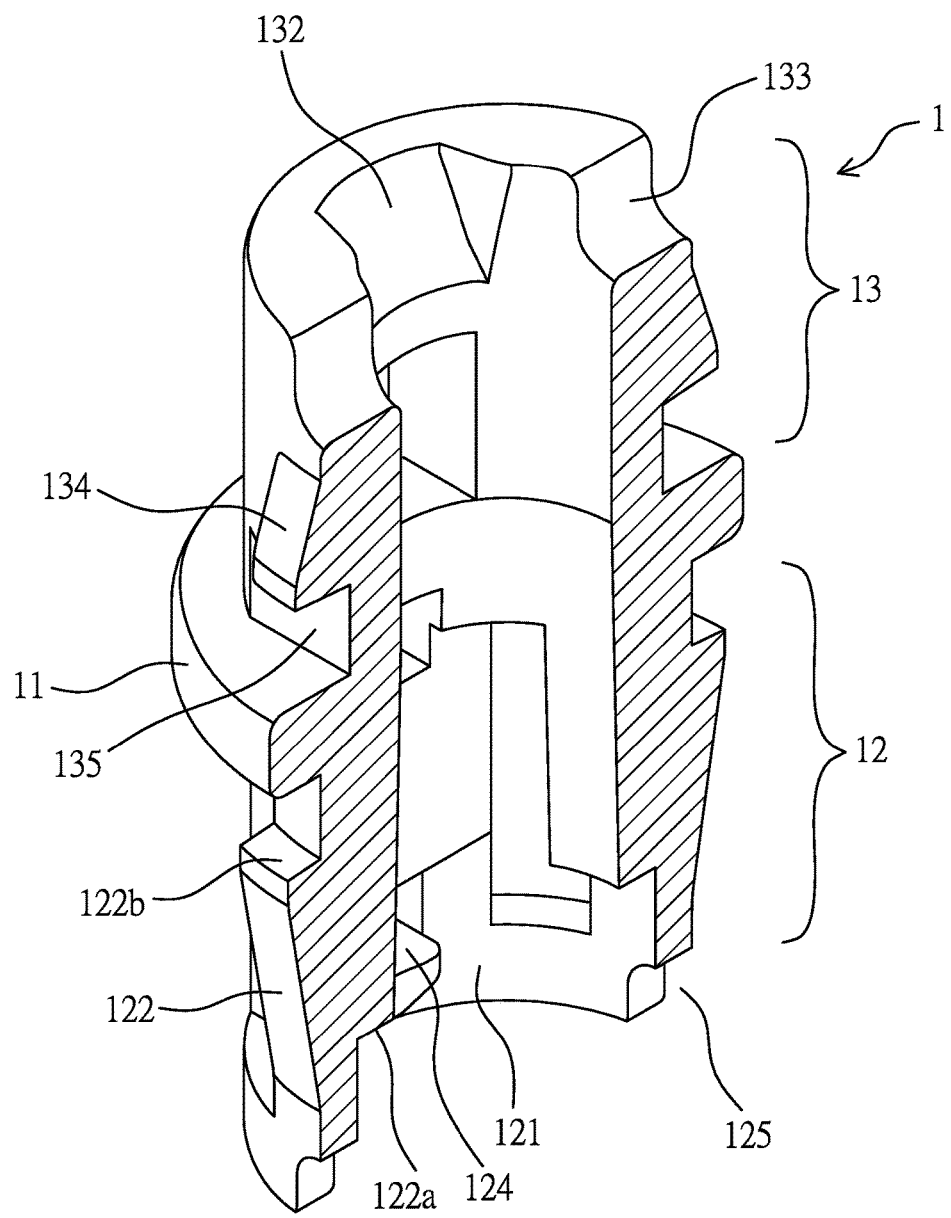
FIG. 2 and FIG. 3 illustrate sectional views taken with respect to line A-A and line B-B of a connecting tube of FIG. 1 respectively.

As illustrated in FIG. 1, the multi-function light guide socket includes a connecting tube 1 and an optical component 2, which is to be connected with the connecting tube 1. Both the connecting tube 1 and the optical component 2 are one-piece molded components and can be formed by a plastic injection molding process.

The connecting tube 1 has a peripheral ring plate 11 perpendicular to an axial direction of the connecting tube 1, and the peripheral ring plate 11 has an outer diameter larger than the connecting tube 1 for providing a border dividing a light source fixation part 12 for installing a light emitting diode 3 and a component fixation part 13 for installing the optical component 2. The light source fixation part 12 has a pair of hollowed slots 121 opposing each other at two peripheral locations thereof, each hollowed slots 121 having a first column 122 formed along the axial direction therein. The first column 122 has a first low-side stop edge 122a on an inner surface thereof extending perpendicular to the axial direction, and a first low-side wedge 122b on an outer surface thereof having an engaging edge extending perpendicular to the axial direction. A gap is formed between each first low-side wedge 122b and the peripheral ring plate 11 for clamping a board hole 41 of a board 4 (shown in FIG. 10).

The connecting tube 1 has at least one second column 123 formed at at least one peripheral location thereof. The connecting tube 1 preferably has a pair of the second columns 123 opposing each other at two peripheral locations thereof, and the pair of the second columns 123 are located in a line perpendicular to a line in which a pair of the first columns 122 are located. The second column 123 has a second low-side stop edge 123a (shown in FIG. 3) on an inner surface thereof extending perpendicular to the axial direction, and a second low-side wedge 123b on an outer surface thereof having an engaging edge extending perpendicular to the axial direction. A gap is formed between each second low-side wedge 123b and the peripheral ring plate 11 for clamping a board hole 41 of a board 4 (shown in FIG. 10). Besides, each second column 123 has a through slot 123c at a low-side location thereof extending perpendicular to the axial direction for a sliding block of a mold apparatus to pass through.

Figure 3:
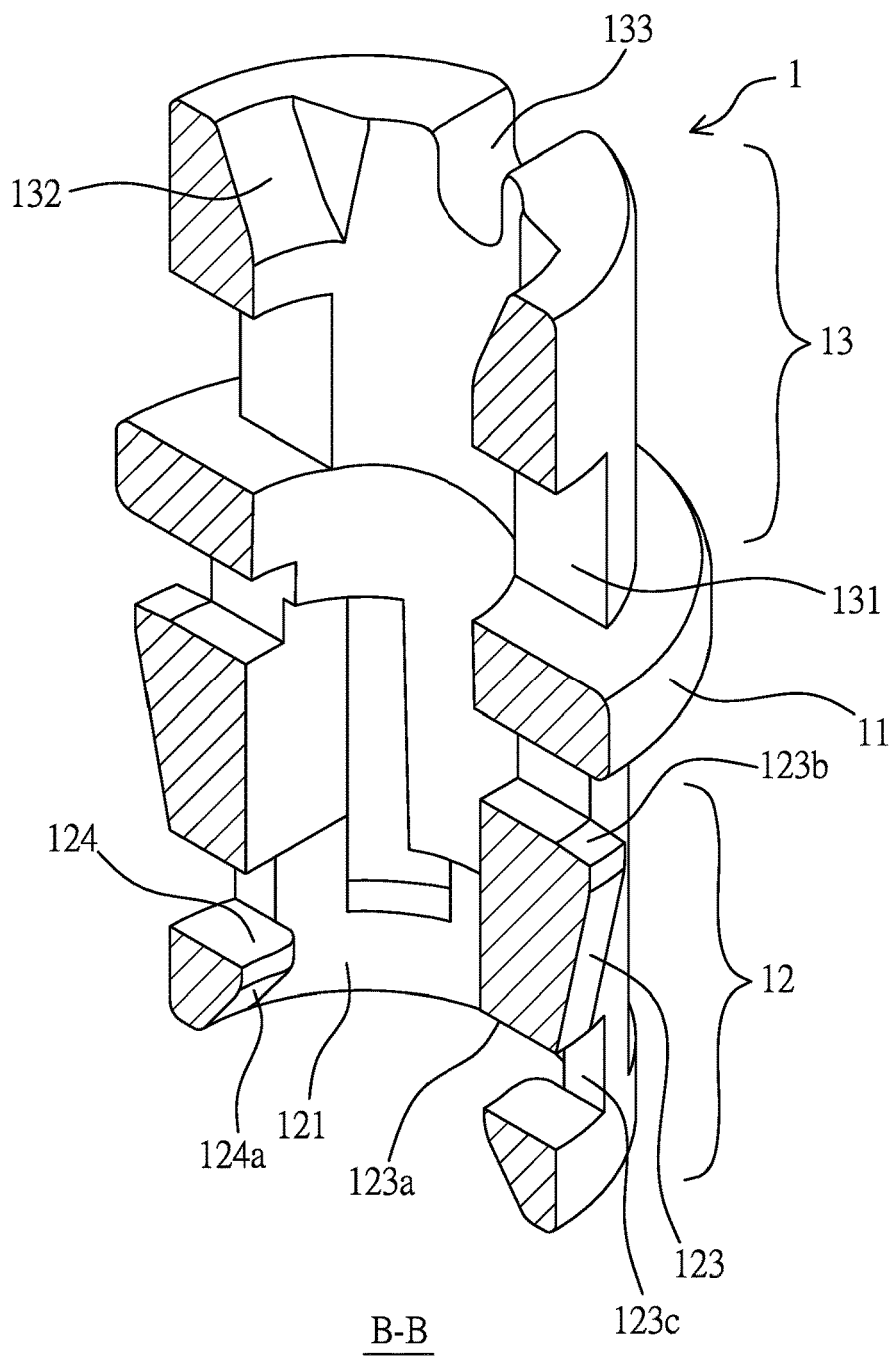
Figure 4:
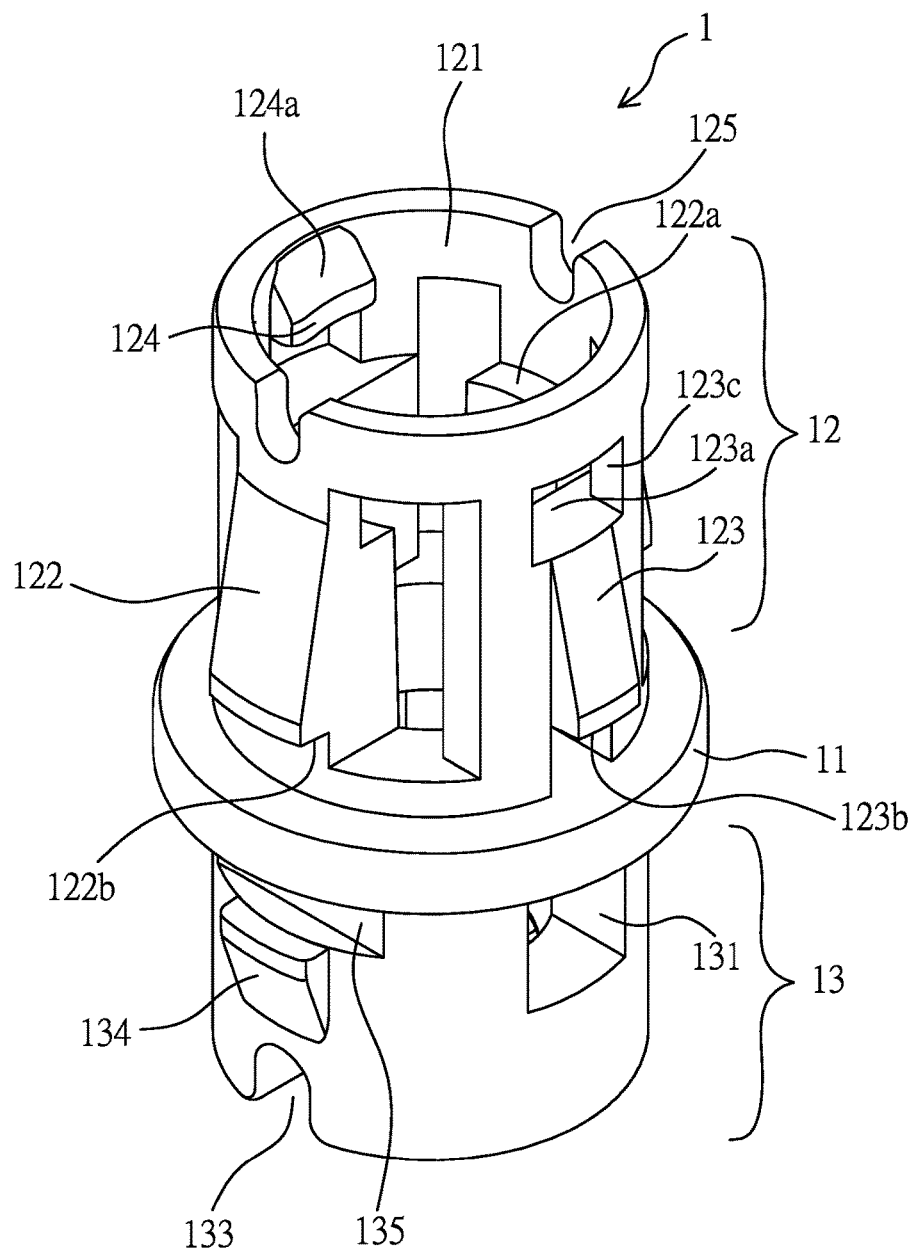
FIG. 4 illustrates an outline view of the connecting tube of FIG. 1.

As illustrated in FIG. 3 and FIG. 4, the connecting tube 1 has at least two latching flaps 124 protruding from an inner surface of a bottom opening of the connecting tube 1, and preferably the latching flaps 124 are paired to be located at opposite locations and each latching flap 124 extends perpendicular to the axial direction below a through slot 123c. Each latching flap 124 has a first guiding bevel 124a inclined inward for guiding the LED 3 into the bottom opening of the connecting tube 1.

Besides, a pair of the first low-side stop edges 122a and at least one second low-side stop edge 123a provide motion stop contacts at a same horizontal level, so that a flange 31 of the LED 3 is clamped by the latching flaps 124, the pair of the first low-side stop edges 122a and the at least one second low-side stop edge 123a inside the connecting tube 1 to prevent the LED 3 from getting out of position or detached, or vibrating inside the light source fixation part 12. In addition, a pair of engaging edges of the first low-side wedges 122b and at least one engaging edge of the at least one second low-side wedges 123b provide clamping contacts at a same horizontal level, so as to cooperate with the peripheral ring plate 11 to clamp the board hole 41 of the board 4 to prevent the connecting tube 1 from vibrating.

In addition, as illustrated in FIG. 1 and FIG. 4, the connecting tube 1 has a pair of pin receiving grooves 125 formed at two opposite bottom peripheral locations of the light source fixation part 12, and preferably formed below a pair of the first columns 122 respectively. As a result, the pair of pin receiving grooves 125 can accommodate a pair of pins 32 protruding sideward from an LED 3 of three-pin type. For variant embodiments, the LED 3 can also be of two-pin type or four-pin type.

Figure 6:
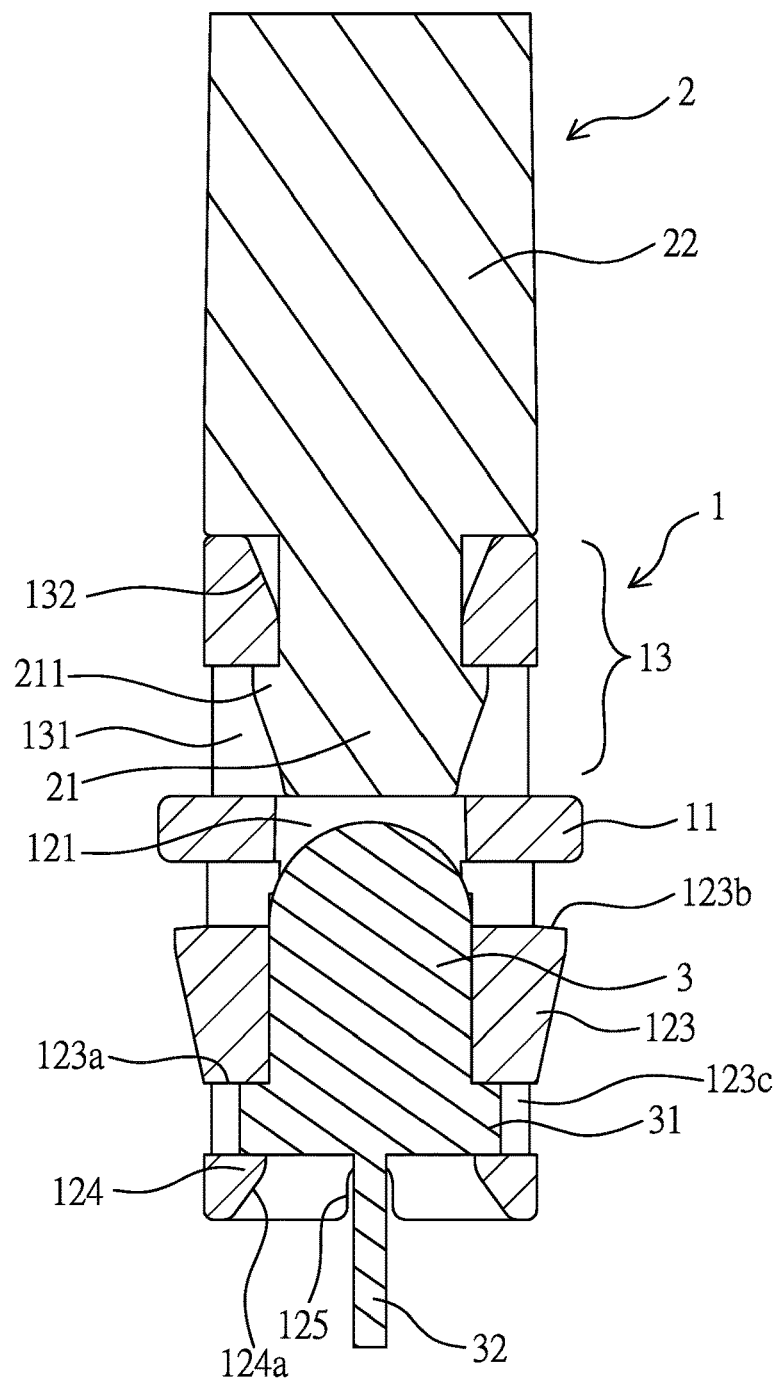
FIG. 6 illustrates a sectional view of the assembled multi-function light guide socket of FIG. 5.
Figure 8:
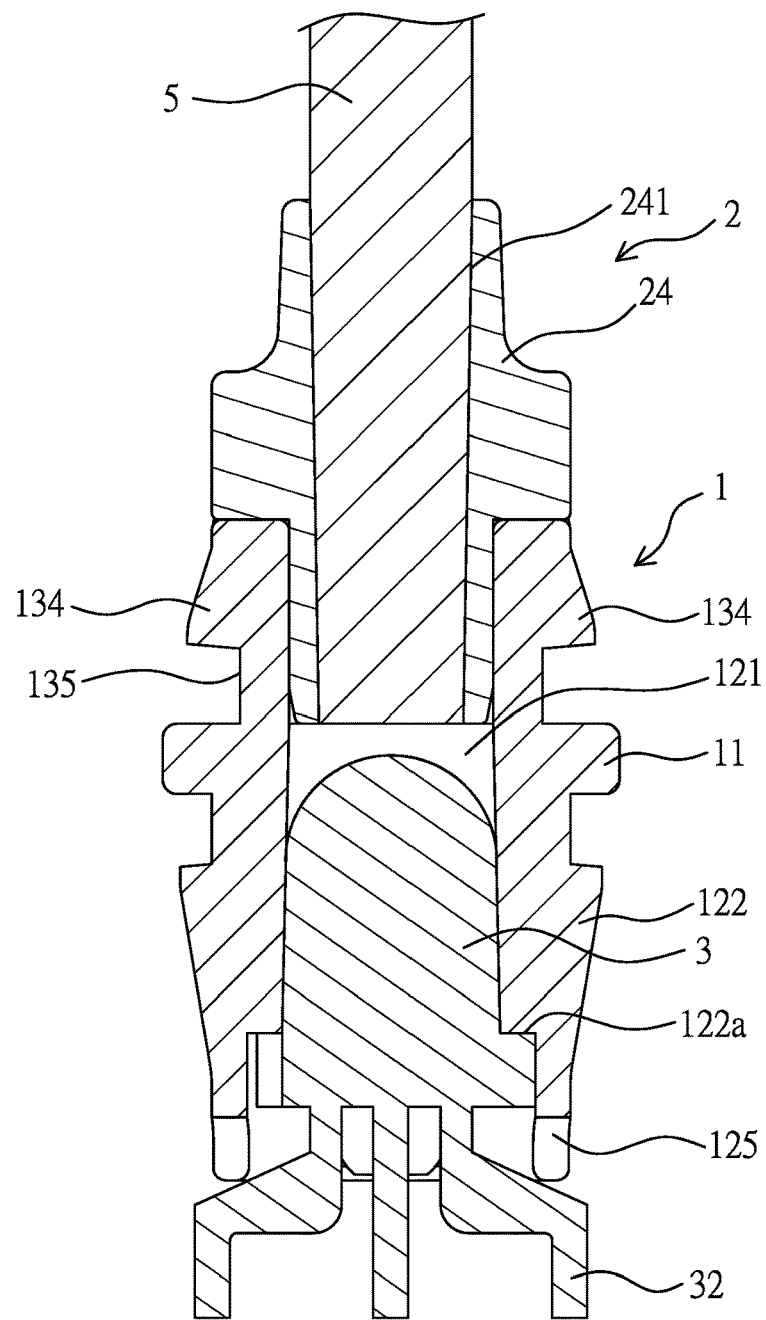
FIG. 8 illustrates a sectional view of the assembled multi-function light guide socket of FIG. 7.

Please refer to FIG. 6 and FIG. 8, which clearly indicate that, to assemble the connecting tube 1 with the LED 3, the LED 3 is inserted into the connecting tube 1 from the bottom opening, then guided by the first guiding bevels 124a until the flange 31 of the LED 3 passes the latching flaps 124, and stopped by the first low-side stop edges 122a and the second low-side stop edges 123a, and the LED 3 is thereby kept in the low side of the connecting tube 1 with the flange 31 clamped by the latching flaps 124 and the first low-side stop edges 122a and the second low-side stop edges 123a, and a pair of pins 32 protruding sideward from the LED 3 being accommodated in the pair of pin receiving grooves 125 and extending downward.

The component fixation part 13 has at least two latching slots 131 at at least two peripheral locations thereof extending perpendicular to the axial direction. As illustrated in FIG. 1, there are two latching slots 131 opposing each other above the peripheral ring plate 11, and two second guiding bevels 132 inclined inward are formed above the two latching slots 131 respectively for guiding the optical component 2 into the component fixation part 13. Besides, to prevent the optical component 2 from rotating relative to the component fixation part 13, the connecting tube 1 has at least one rotation-stop grooves 133 formed at at least one peripheral location of a top opening thereof.

Besides, the connecting tube 1 has at least two high-side wedges 134 on an outer surface thereof along the axial direction. The connecting tube 1 preferably has one pair of the high-side wedges 134, and the pair of the high-side wedges 134 are preferably located in a line perpendicular to a line in which the pair of the latching slots 131 are located. Besides, there is a gap between each high-side wedge 134 and the peripheral ring plate 11 for clamping the board hole 41 of the board 4 (shown in FIG. 11). In addition, to prevent the connecting tube 1 from rotating in the board hole 41, a pair of first vertical plain surfaces 135 are formed between a pair of the high-side wedges 134 and the peripheral ring plate 11 for engaging with a pair of second vertical plain surfaces 411 formed at two opposite sides of the board hole 41 (shown in FIG. 12) to provide a rotation-stop effect.

Figure 5:
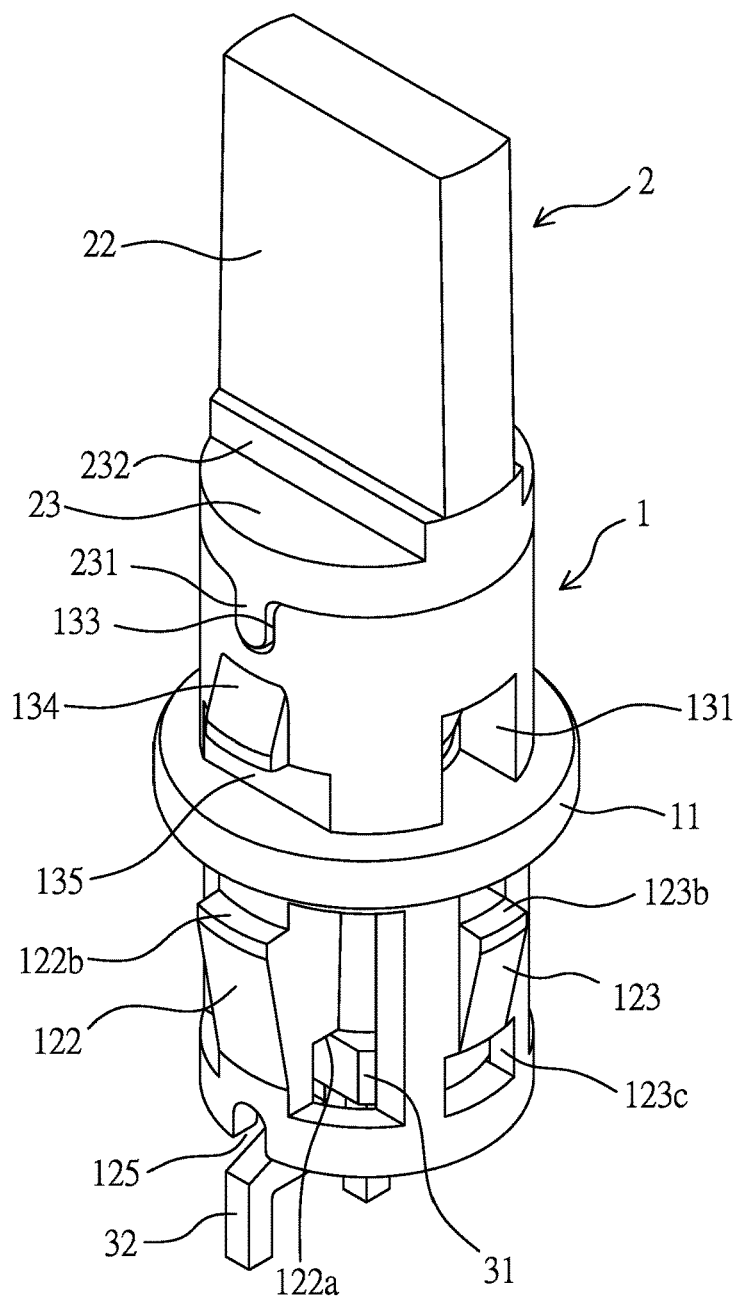
FIG. 5 illustrates a first assembly view of the connecting tube and an optical component of FIG. 1.

Please refer to FIG. 1, FIG. 5 and FIG. 6, in which a first embodiment of the optical component 2 made of a transparent material is illustrated, the optical component 2 including an engaging part 21 for being plugged in the top opening of the connecting tube 1, and the engaging part 21 being a solid part and having protruding hooks 211 for engaging with the latching slots 131 in a way that the protruding hooks 211 can be moved downward along the second guiding bevels 132 to engage with the latching slots 131 to install the optical component 2 into the component fixation part 13. The engaging part 21 has a light guide column 22 of a geometric shape (for example but not limited to a rectangular shape) formed at a high side thereof. When the engaging part 21 is installed in the component fixation part 13, a bottom end of the engaging part 21 will be adjacent to the LED 3 to facilitate a light transmission so that light beams emitted from the LED 3 can be transmitted through the engaging part 21 to enter the light guide column 22, and then be diffused uniformly in the light guide column 22 to provide a uniform and mild lighting for an indication or illumination purpose.

A cover cap 23 is formed between the engaging part 21 and the light guide column 22 for enclosing the top opening, where the cover cap 23 has at least one rotation-stop tenon 231 formed on a bottom surface thereof, and each rotation-stop tenon 231 is for being inserted into a rotation-stop groove 133 to prevent the optical component 2 from rotating in the top opening of the connecting tube 1. In addition, the cover cap 23 can also provide a positioning effect when installed in a display panel by having a positioning flange 232 of a geometric shape, for example but not limited to square shape, formed at a border between the cover cap 23 and the light guide column 22, and the positioning flange 232 being used for engaging with a positioning hole of the display panel (not shown in the figure) to attain the positioning effect.

Figure 7:
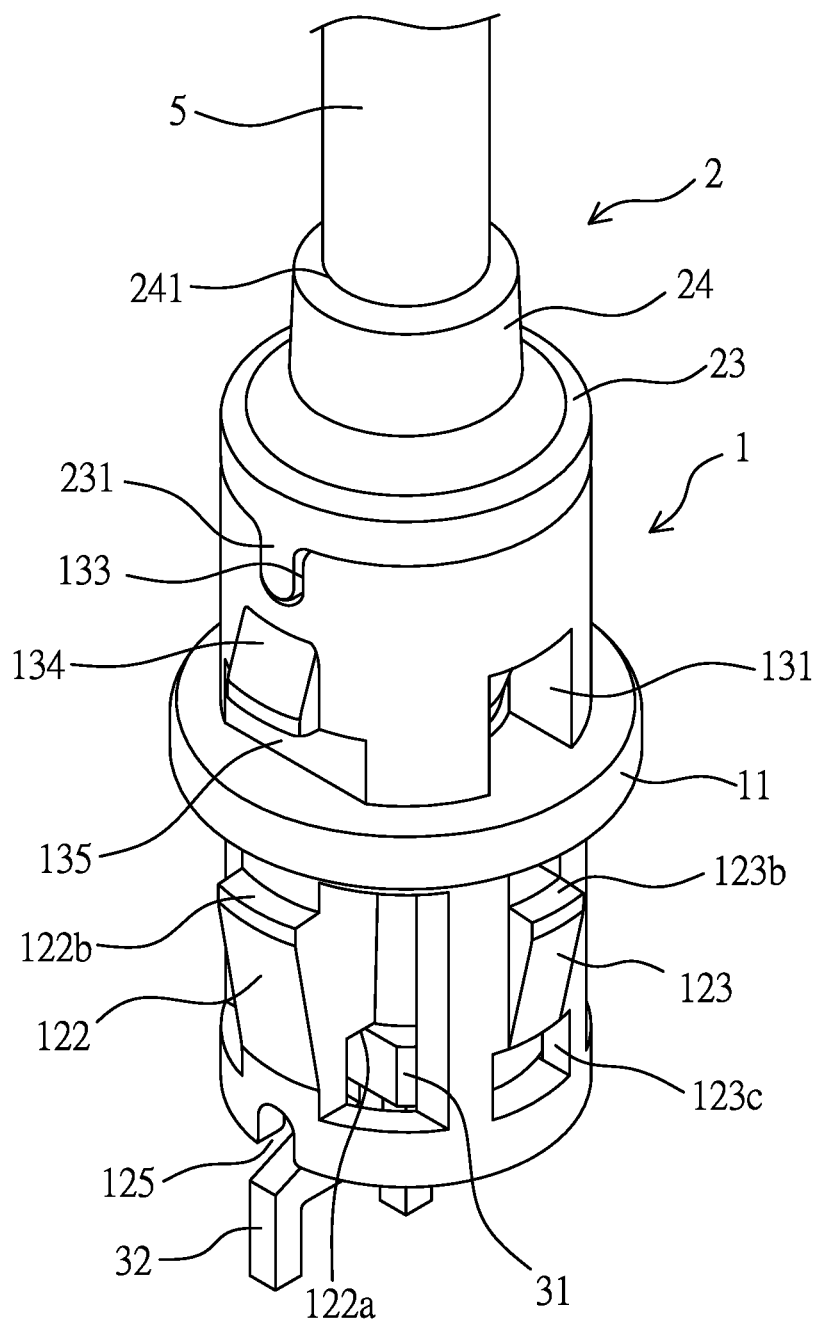
FIG. 7 illustrates a second assembly view of the connecting tube and an optical component of FIG. 1.

Please refer to FIG. 1, FIG. 7 and FIG. 8, in which a second embodiment of the optical component 2 made of a transparent material or an opaque material is illustrated. As the second embodiment the optical component 2 shares same numerical symbols with the first embodiment for many same components or same parts, only components or parts of the second embodiment not found in the first embodiment will be addressed hereafter.

The engaging part 21 connects with a receiving tube 24 in the axial direction, the receiving tube 24 having a cable receiving hole 241 connected with the engaging part 21 for an optical fiber cable 5 to plug in. After the optical fiber cable 5 is plugged in the cable receiving hole 241, a bottom end of the optical fiber cable 5 will be adjacent to the LED 3 to facilitate light transmission, and thereby provide a function of light indication, illumination, or data transmission.

In addition, a cover cap 23 is formed between the engaging part 21 and the receiving tube 24 for enclosing the top opening of the connecting tube 1, where the cover cap 23 has at least one rotation-stop tenon 231 formed on a bottom surface thereof, and each rotation-stop tenon 231 is for being inserted into a rotation-stop groove 133 to prevent the optical component 2 from rotating in the top opening of the connecting tube 1.

Figure 9:
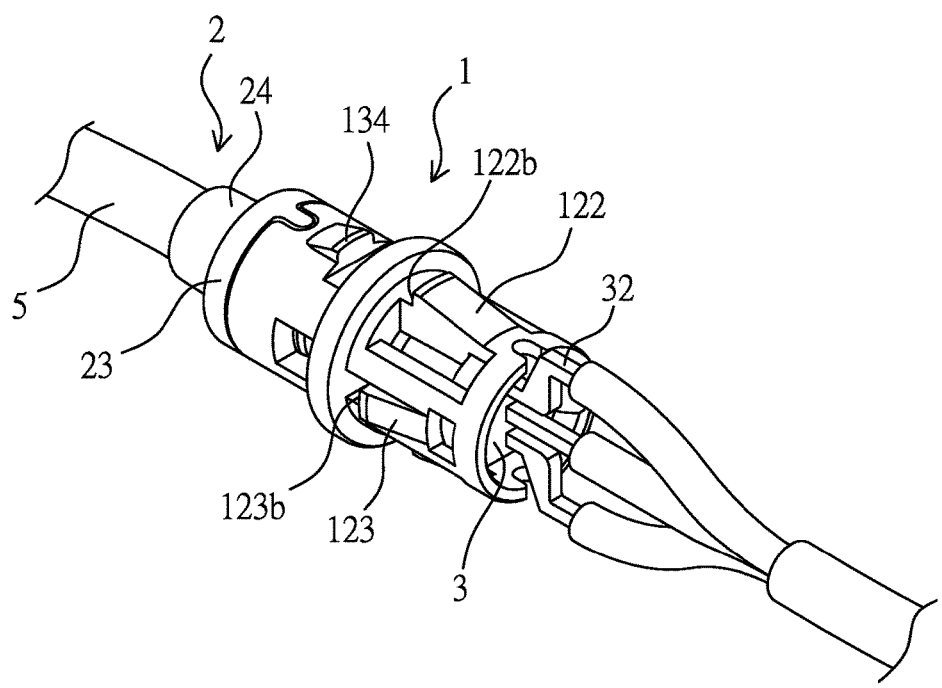
FIG. 9 illustrates a scenario of the multi-function light guide socket of FIG. 7 connected with an optical fiber.

Please refer to FIG. 9, which illustrates a scenario that the connecting tube 1, the optical component 2 with the receiving tube 24, and the optical fiber cable 5 are assembled together. In this scenario, the multi-function light guide socket does not have to engage with a board, so the first low-side wedges 122*b*, the second low-side wedges 123*b*, and the high-side wedges 134 can all be omitted.

Figure 10:
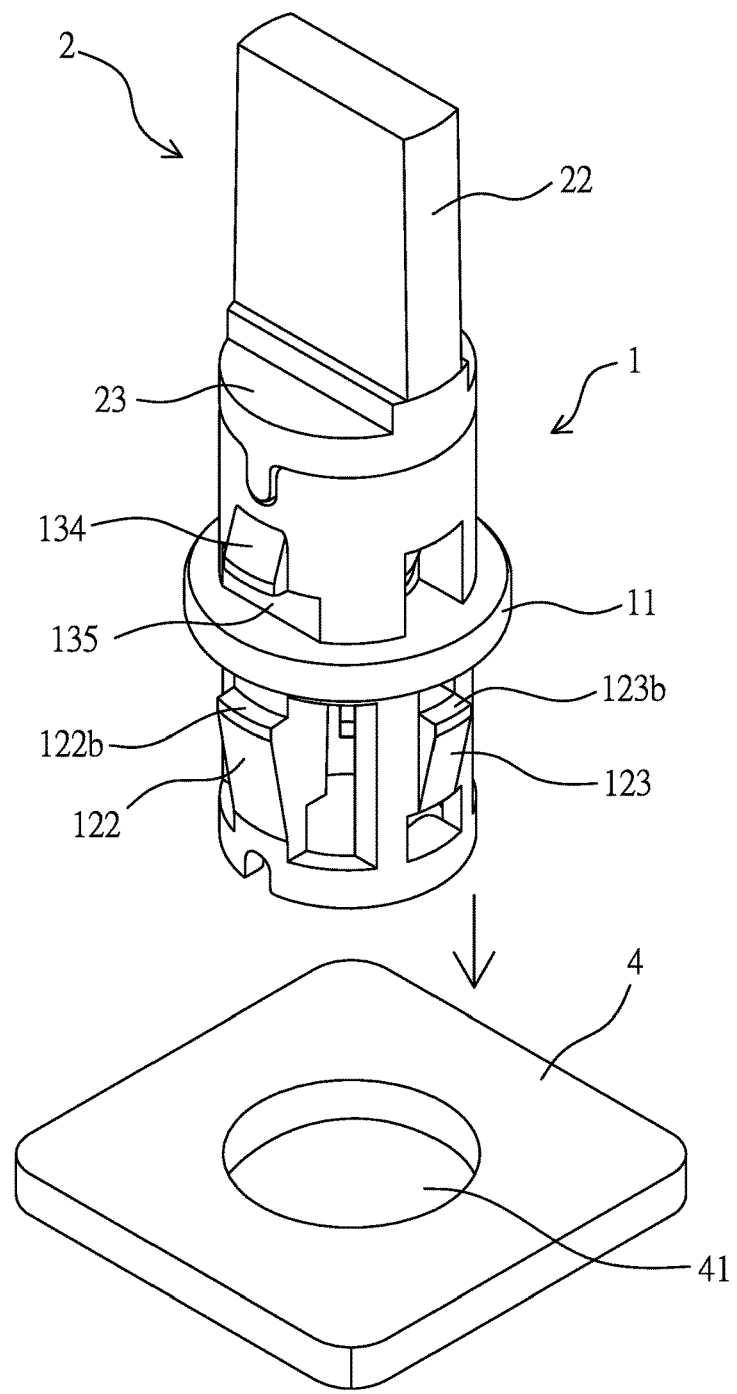
FIG. 10 illustrates a scenario that the assembled multi-function light guide socket of FIG. 5 is to be installed into a plate.

Please refer to FIG. 10, which illustrates a scenario that a combination of the connecting tube 1 and the optical component 2 with the light guide column 22 is to be installed in a board 4. In this scenario, the connecting tube 1 is to be inserted into a board hole 41 of the board 4 with a bottom end thereof in alignment with the board hole 41, and a pair of the first low-side wedges 122*b*, the at least one second low-side wedge 123*b*, and the peripheral ring plate 11 will cooperate to clamp the board hole 41 to form a firm combination, and thereby prevent shaking of the connecting tube 1.

Figure 11:
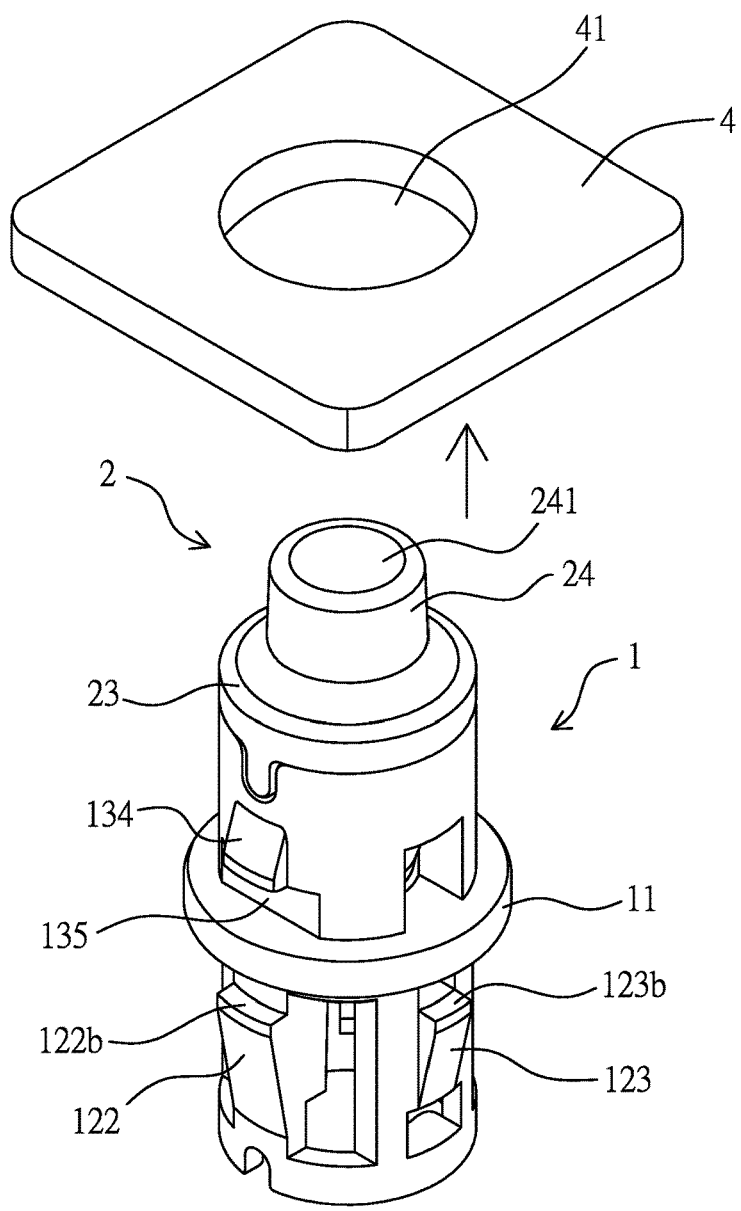
FIG. 11 illustrates a scenario that the assembled multi-function light guide socket of FIG. 7 is to be installed into a plate.

Please refer to FIG. 11, which illustrates a scenario that a combination of the connecting tube 1 and the optical component 2 with the receiving tube 24 is to be installed in a board 4. In this scenario, the connecting tube 1 is to be inserted into a board hole 41 of the board 4 with a top end thereof in alignment with the board hole 41, and at least two high-side wedges 134 and the peripheral ring plate 11 will cooperate to clamp the board hole 41 to form a firm combination, and thereby prevent shaking of the connecting tube 1. After the connecting tube 1 is firmly combined with the board 4, the optical fiber cable 5 can be inserted into the cable receiving hole 241 to finish the installation of the optical fiber cable 5 with the multi-function light guide socket.

Figure 12:
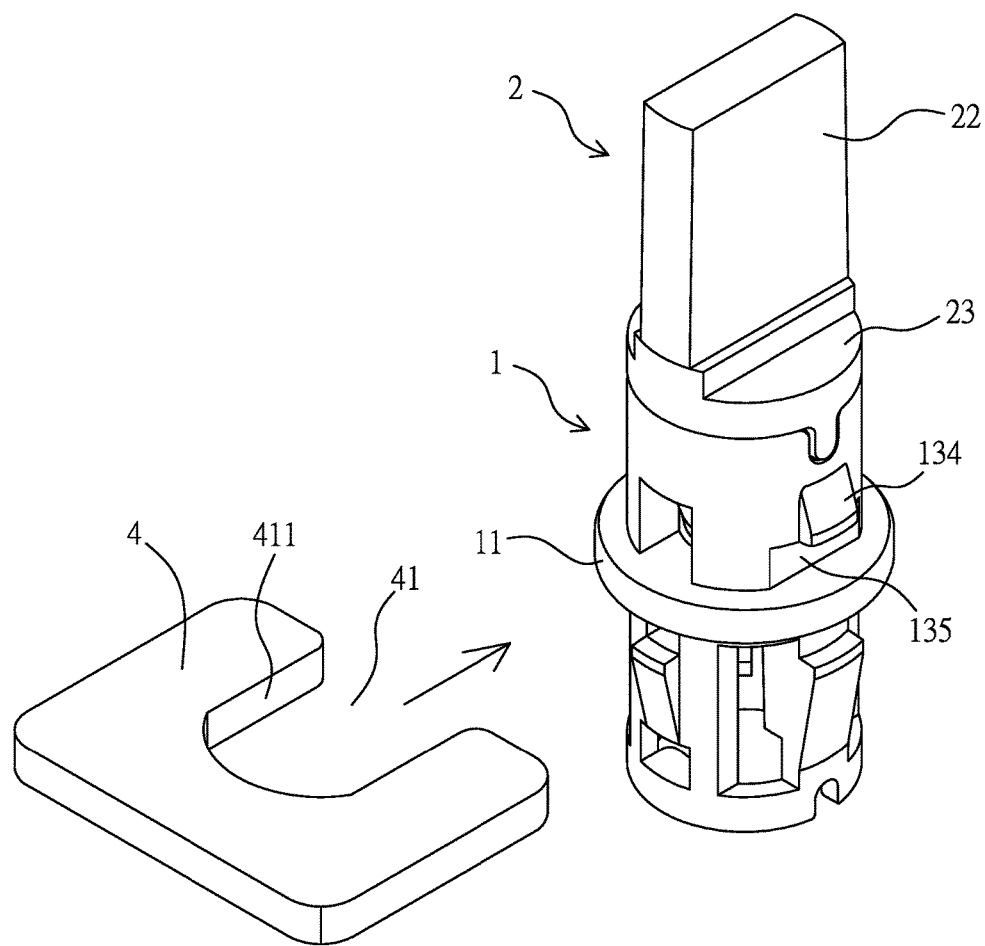
FIG. 12 illustrates a scenario that the assembled multi-function light guide socket of FIG. 5 is to be installed into another plate.

Please refer to FIG. 12, which illustrates a scenario that a combination of the connecting tube 1 and the optical component 2 with the light guide column 22 is to be installed in a board 4. In this scenario, a U-shaped board hole 41 of the board 4 is to be engaged with the gaps between the high-side wedges 134 and the peripheral ring plate 11 and clamped by the high-side wedges 134 and the peripheral ring plate 11, and the pair of first vertical plain surfaces 135 formed between the high-side wedges 134 and the peripheral ring plate 11 will be engaged with the pair of second vertical plain surfaces 411 formed at two opposite sides of the board hole 41 to prevent the connecting tube 1 from rotating in the board hole 41.

As a result, thanks to the novel designs disclosed above, the present invention can offer advantages as follows:

1. By adopting modular designs, the connecting tube can combine with different optical components according to different light guide requirements, such as light indication, illumination, or data transmission, so as to reduce inventory quantity of the optical components and thereby reduce inventory cost.

2. The multi-function light guide socket of the present invention can be optionally engaged with or not engaged with a board according to practical applications, so as to provide a wide range of applications. Therefore, the present invention has made a breakthrough in the field of the present invention.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-function light guide socket, including:
a connecting tube, having an axial direction and including a light source fixation part at a low side and a component fixation part at a high side, the light source fixation part having a pair of hollowed slots formed opposite each other at two peripheral locations thereof, each slot of the pair of hollowed slots having a first column formed therein along the axial direction, the first column having a first low-side stop edge on an inner surface thereof extending perpendicular to the axial direction, the connecting tube having at least two latching flaps protruding from an inner surface of a bottom opening of the light source fixation part to cooperate with a pair of the first low-side stop edges to clamp a flange of a light emitting diode, and the component fixation part having at least two latching slots at at least two peripheral locations thereof extending perpendicular to the axial direction; and
an optical component, made of a transparent material and including an engaging part for being plugged into the component fixation part, the engaging part having at least two protruding hooks for engaging with the at least two latching slots to fix the optical component in the component fixation part, and a light guide column having a geometric shape being formed at an upper side of the engaging part.

2. The multi-function light guide socket as disclosed in claim 1, wherein the connecting tube has a peripheral ring plate separating the light source fixation part and the component fixation part; the first column has a first low-side wedge on an outer surface thereof with an engaging edge extending perpendicular to the axial direction; and the connecting tube has at least one second column formed at at least one peripheral location of the light source fixation part along the axial direction, the second column having a second low-side stop edge on an inner surface thereof extending perpendicular to the axial direction and a second low-side wedge on an outer surface thereof with an engaging edge extending perpendicular to the axial direction, the engaging edges of a pair of the first low-side wedges and one or more of the engaging edges of one or more of the second low-side wedges together forming a clamping plane, a gap being formed between the clamping plane and the peripheral ring plate, and a pair of the first low-side stop edges, a pair of the second low-side stop edges, and the latching flaps cooperating with each other to clamp the flange.

3. The multi-function light guide socket as disclosed in claim 1, wherein the connecting tube has a pair of pin receiving grooves formed at two opposite bottom peripheral locations of the light source fixation part.

4. The multi-function light guide socket as disclosed in claim 3, wherein the pair of pin receiving grooves are located directly below a pair of the first columns correspondingly.

5. The multi-function light guide socket as disclosed in claim 2, wherein the connecting tube has a pair of the second columns formed at two opposite peripheral locations of the light source fixation part, and the pair of second columns are located in a line perpendicular to a line in which a pair of the first columns are located.

6. The multi-function light guide socket as disclosed in claim 2, wherein the connecting tube has a pair of the latching flaps formed at two opposite peripheral locations of a bottom opening of the light source fixation part, and has a pair of the latching slots opposing each other above the peripheral ring plate.

7. The multi-function light guide socket as disclosed in claim 6, wherein each said latching flap has a first guiding bevel inclined inward, and the component fixation part has a second guiding bevel inclined inward above each said latching slot.

8. The multi-function light guide socket as disclosed in claim 1, wherein the component fixation part has at least one rotation-stop groove formed at at least one peripheral location of a top opening; a cover cap is formed between the engaging part and the light guide column for enclosing the top opening; and the cover cap has at least one rotation-stop tenon formed at a bottom surface thereof for being inserted into the at least one rotation-stop groove respectively.

9. The multi-function light guide socket as disclosed in claim 8, wherein a positioning flange of a geometric shape is formed at a border location between the cover cap and the light guide column.

10. The multi-function light guide socket as disclosed in claim 2, wherein the connecting tube has at least one first vertical plain surface formed on an outer surface of the component fixation part, each of the least one first vertical plain surface being located above the peripheral ring plate and below a high-side wedge.

11. A multi-function light guide socket, including:
a connecting tube, having an axial direction and including a light source fixation part at a low side and a component fixation part at a high side, the light source fixation part having a pair of hollowed slots formed opposite each other at two peripheral locations thereof, each slot of the pair of hollowed slots having a first column formed therein along the axial direction, the first column having a first low-side stop edge on an inner surface thereof extending perpendicular to the axial direction, the connecting tube having at least two latching flaps protruding from an inner surface of a bottom opening of the light source fixation part to cooperate with a pair of the first low-side stop edges to clamp a flange of a light emitting diode, and the component fixation part having at least two latching slots at at least two peripheral locations thereof extending perpendicular to the axial direction; and
an optical component, including an engaging part for being plugged into the component fixation part, the engaging part having at least two protruding hooks for engaging with the at least two latching slots to fix the optical component in the component fixation part, and a receiving tube being formed along the axial direction at an upper side of the engaging part and having a cable receiving hole connected with the engaging part for insertion of an optical fiber.

12. The multi-function light guide socket as disclosed in claim 11, wherein the connecting tube has a peripheral ring plate separating the light source fixation part and the component fixation part; the first column has a first low-side wedge on an outer surface thereof with an engaging edge extending perpendicular to the axial direction; and the connecting tube has at least one second column formed at at least one peripheral location of the light source fixation part along the axial direction, the second column having a second low-side stop edge on an inner surface thereof extending perpendicular to the axial direction and a second low-side wedge on an outer surface thereof with an engaging edge extending perpendicular to the axial direction, the engaging edges of a pair of the first low-side wedges and one or more of the engaging edges of one or more of the second low-side wedges together forming a clamping plane, a gap being formed between the clamping plane and the peripheral ring plate, and a pair of the first low-side stop edges, a pair of the second low-side stop edges, and the latching flaps cooperating with each other to clamp the flange.

13. The multi-function light guide socket as disclosed in claim 11, wherein the connecting tube has a pair of pin receiving grooves formed at two opposite bottom peripheral locations of the light source fixation part.

14. The multi-function light guide socket as disclosed in claim 13, wherein the pair of pin receiving grooves are located directly below a pair of the first columns correspondingly.

15. The multi-function light guide socket as disclosed in claim 12, wherein the connecting tube has a pair of the second columns formed at two opposite peripheral locations of the light source fixation part, and the pair of the second columns are located in a line perpendicular to a line in which a pair of the first columns are located.

16. The multi-function light guide socket as disclosed in claim 12, wherein the connecting tube has a pair of the latching flaps formed at two opposite peripheral locations of a bottom opening of the light source fixation part, and has a pair of the latching slots opposing each other above the peripheral ring plate.

17. The multi-function light guide socket as disclosed in claim 16, wherein each said latching flap has a first guiding bevel inclined inward, and the component fixation part has a second guiding bevel inclined inward above each said latching slot.

18. The multi-function light guide socket as disclosed in claim 11, wherein the component fixation part has at least one rotation-stop groove formed at at least one peripheral location of a top opening; a cover cap is formed between the engaging part and the receiving tube for enclosing the top opening; and the cover cap has at least one rotation-stop tenon formed at a bottom surface thereof for being inserted into the at least one rotation-stop groove respectively.

19. The multi-function light guide socket as disclosed in claim 12, wherein the connecting tube has at least one first vertical plain surface formed on an outer surface of the component fixation part, each of the least one first vertical plain surface being located above the peripheral ring plate and below a high-side wedge.

\* \* \* \* \*